US008683273B2

(12) United States Patent
Jung et al.

(10) Patent No.: US 8,683,273 B2
(45) Date of Patent: Mar. 25, 2014

(54) METHOD AND SYSTEM FOR NOTIFYING ERROR INFORMATION IN A NETWORK

(75) Inventors: Dong-Shin Jung, Suwon-si (KR); Joo-Yeol Lee, Seoul (KR); Siddapur Channakeshava Sreekanth, Bangalore (IN); Subramanian Krishnamurthy, Bangalore (IN); Vedula Kiran Bharadwaj, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 918 days.

(21) Appl. No.: 12/744,646

(22) PCT Filed: Nov. 19, 2008

(86) PCT No.: PCT/KR2008/006802
§ 371 (c)(1), (2), (4) Date: May 25, 2010

(87) PCT Pub. No.: WO2009/069912
PCT Pub. Date: Jun. 4, 2009

(65) Prior Publication Data

US 2010/0269107 A1 Oct. 21, 2010

(30) Foreign Application Priority Data

Nov. 26, 2007 (IN) ........................... 2762/CHE/2007

(51) Int. Cl.
*G06F 11/00* (2006.01)

(52) U.S. Cl.
USPC ........................................................... 714/57

(58) Field of Classification Search
USPC ........................................................... 714/57
See application file for complete search history.

(56) References Cited

U.S. PATENT DOCUMENTS 7,085,814 B1 * 8/2006 Gandhi et al. ................ 709/208

(Continued)

FOREIGN PATENT DOCUMENTS

| | | |
|---|---|---|
| CN | 1842772 | 10/2006 |
| EP | 1 811 476 | 7/2007 |

(Continued)

OTHER PUBLICATIONS

Java Application Programming Interface User's Guide (http://www.geom.uiuc.edu/~daeron/docs/apidocs/API_users_guide.html, May 2006) (select pages provided).*

(Continued)

*Primary Examiner* — Michael Maskulinski
*Assistant Examiner* — Neil Miles
(74) *Attorney, Agent, or Firm* — The Farrell Law Firm, P.C.

(57) ABSTRACT

Method and application server for providing an asynchronous error notification from an application server to an application server controller in a network is provided. The method at the application server includes generating an error message when an error occurs at/during Open Service Gateway initiative (OSGi) framework runtime. The method also includes converting the error message as a Universal Plug and Play (UPnP) event. Moreover, the method includes providing the UPnP event comprising error information to the application server controller. The application server includes a receiver configured to receive a command from an application server controller to install an application in an Open Service Gateway initiative (OSGi) framework available at the application server. The application server also includes a processor configured to generate an error message when an error occurs during installation of the application in the framework and convert the error message as a Universal Plug and Play (UPnP) event. Moreover, the application server includes a transmitter configured to provide the UPnP event comprising the error information to the application server controller.

13 Claims, 2 Drawing Sheets

(56) References Cited

U.S. PATENT DOCUMENTS

| | | | |
|---|---|---|---|
| 2002/0095485 A1 | 7/2002 | Maekawa et al. | |
| 2004/0139177 A1 | 7/2004 | Yook | |
| 2005/0066024 A1 | 3/2005 | Crocitti et al. | |
| 2005/0195390 A1* | 9/2005 | Jeon et al. | 356/237.2 |
| 2006/0041924 A1* | 2/2006 | Bushmitch et al. | 725/132 |
| 2006/0070063 A1 | 3/2006 | Takashige et al. | |
| 2008/0069121 A1 | 3/2008 | Adamson et al. | |
| 2008/0095179 A1* | 4/2008 | Lee et al. | 370/401 |

FOREIGN PATENT DOCUMENTS

| | | |
|---|---|---|
| KR | 10-2004-0062268 A | 7/2004 |
| KR | 10-2006-0110972 A | 10/2006 |
| KR | 10-2007-0032685 A | 3/2007 |

OTHER PUBLICATIONS

OSGi Service Platform Core Specifictaion, The OSGi Alliance, Release 4 Version 4.1, Apr. 2007.*

OSGi Service Platform Service Compendium, The OSGi Alliance, Release 4 Version 4.1, Apr. 2007.*

Gouin-Vallerand et al., "Managing and Deployment of Applications with OSGI in the Context of Smart Homes", Third IEEE International.

Conference on Wireless and Mobile Computing, Networking and Communications (WiMob 2007), Oct. 8, 2007.

Ahn et al., "Towards Reliable OSGI Framework and Applications", ACM, Apr. 23, 2006.

The Open Services Gateway Initiative: OSGI Service Platform Release 3—Chapter 1-4, 10, 25; XP-002585863, Mar. 1, 2003.

Written Opinion of the International Search Report Authority, dated Apr. 27, 2009 (PCT/ISA/237) (3 pp.).

* cited by examiner

METHOD AND SYSTEM FOR NOTIFYING ERROR INFORMATION IN A NETWORK

TECHNICAL FIELD

The present invention relates to notifying error information in a network. More specifically, the present invention relates to a method and system for providing an asynchronous error notification from an application server to an application server controller.

BACKGROUND ART

An application server controller can install applications in an application server which is having an Open Service Gateway initiative (OSGi) framework as the execution environment. The application server controller can install applications in the application server via a network. Some examples of the network include Local Area Network (LAN), Wireless LAN (WLAN). At any time during execution of the application (or runtime of the OSGi framework), some error can occur at the application server. Errors occurring at the application server can be generated as framework exceptions/exceptions. Some examples of these exceptions include BundleException, InvalidSyntaxException and DeploymentException. The errors that occurs at the application server needs to be reported to the application server controller. This helps the application server controller to take necessary actions and to stop sending unnecessary network messages to the application (in the application server).

In light of the above discussion, there is a need of a method and system for providing an asynchronous error notification from an application server to an application server controller.

DISCLOSURE OF INVENTION

Technical Solution

In an embodiment, a method for providing an asynchronous error notification from an application server to an application server controller in a network is provided. The method at the application server includes generating an error message when an error occurs during Open Service Gateway initiative (OSGi) framework runtime (or execution of an application). The method also includes converting the error message as a Universal Plug and Play (UPnP) event. Moreover, the method includes providing the UPnP event comprising error information to the application server controller. In an embodiment, the error is associated with an exception in the OSGi framework. Examples of the exception include, but are not limited to, BundleException, InvalidSyntaxException, DeploymentException, Input/Output (IO) exception, security exception, MalformedURLException, RuntimeException, IllegalStateException, and IllegalArgumentException.

In another embodiment, an application server is provided. The application server includes a receiver configured to receive a command from an application server controller to install an application in an Open Service Gateway initiative (OSGi) framework available at the application server. The application server also includes a processor configured to generate an error message when an error occurs during OSGi framework runtime (or execution of an application) and convert the error message as an Universal Plug and Play (UPnP) event. Moreover, the application server includes a transmitter configured to provide the UPnP event comprising the error information to the application server controller. In an embodiment, the application server also includes a receiver configured to receive a Universal Resource Locator (URL) of the application server controller.

The features and advantages of the present invention will become more apparent from the ensuing detailed description of the invention taken in conjunction with the accompanying drawings.

MODE FOR THE INVENTION

The terms used to describe various embodiments are exemplary. It should be understood that these are provided to merely aid the understanding of the description, and that their use and definitions in no way limit the scope of the invention.

Figure 1:
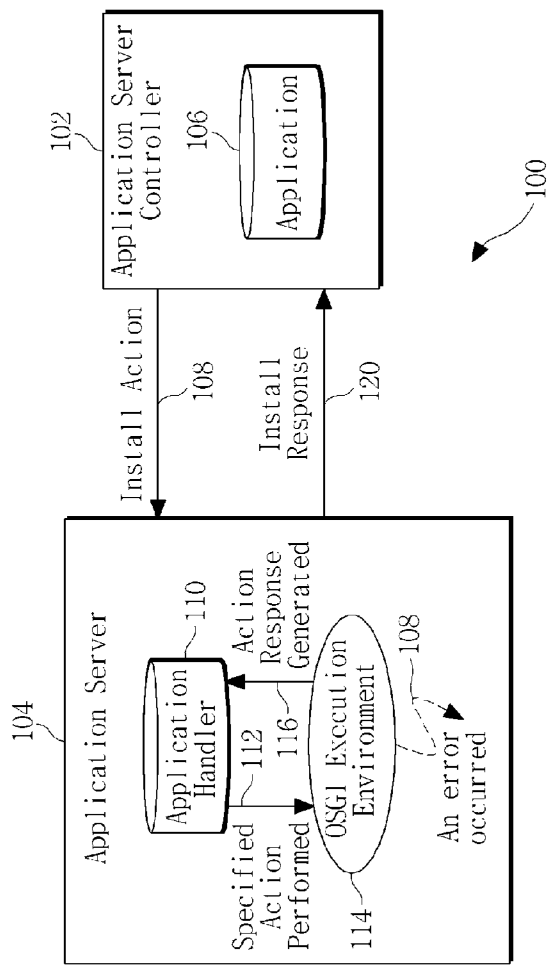
FIG. 1 illustrates a network where various embodiments of the present invention can be practiced.

FIG. 1 illustrates a network 100, where various embodiments of the present invention can be practiced. The network 100 can include one or more application servers and one or more application server controllers. Examples of network 100 include, but are not limited to, a Local Area Network (LAN) and Wireless Local Area Network (WLAN). For the purpose of this description, the network 100 is shown to include an application server controller 102 and an application server 104. Examples of application server controller and application server include, but are not limited to, mobile phones, laptops, personal computers, personal digital assistants, printers, access points, Television, media players, Internet Gateway Devices. This embodiment will be explained with the help of the application server controller 102 and application server 104. However, it will be apparent to a person ordinarily skilled in the art that the present embodiment can be explained/implemented by using any other application server controller and application server in the network 100.

The application server controller 102 can install an application 106 on application server 104. To install an application, application server controller 102 sends an install action message/command 108 to the application server 104. The install action message 108 is received by an application handler 110 in the application server 104. The application handler 110 generates a message 112 indicating specified actions to be performed by an Open Service Gateway initiative (OSGi) framework 114 (present in the application server 104) in response to the install action message 108. The application server 104 supports different actions like install, start, stop, update and uninstall. The action message can be a Hyper Text Type Protocol (HTTP) request to a particular Universal Resource Locator (URL) given in a service description. This action message expects a response.

The OSGi framework 114 generates an action response 116 in response to the message 112. The action response 116 is the response to the HTTP request. It contains the information about the success or failure of the HTTP request, for example, the action message. The OSGi framework 114 can also generate an error message 118 if an error occurs during execution of the application 106. For example, the OSGi framework 114 can generate an error message when an error occurs during installation of the application 106. The error 118 occurring during the execution of an application in the OSGi framework 114 can be generated as a framework exception or a Java exception. Examples of the exceptions include, but are not limited to BundleException, InvalidSyntaxException, DeploymentException, Input/Output (IO) exception, security exception, MalformedURLException, RuntimeException, IllegalStateException, and IllegalArgumentException. These exceptions are then provided to the application server controller 102 by the application server 104. In an embodiment, an install response 120 can also be provided to the application server controller 102. The install response 120 is the response to the HTTP request. It contains the information about the success or failure of the HTTP request, for example, the install message. The functionalities of the application server 104 is explained in detail with FIG. 2.

Figure 2:
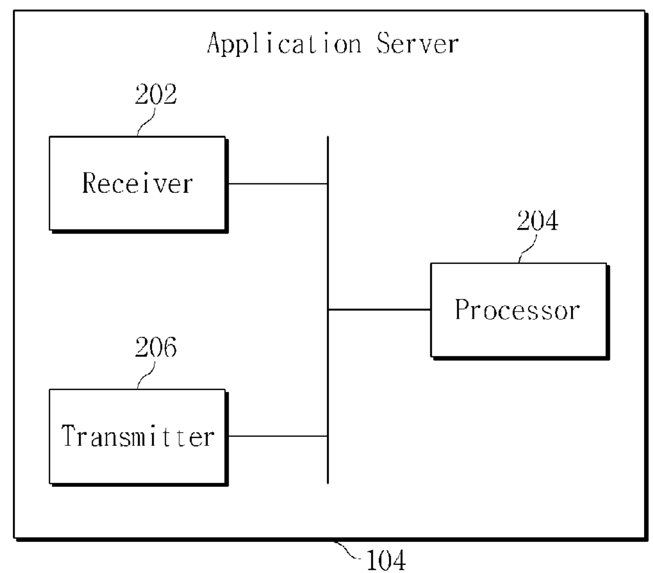
FIG. 2 illustrates an application server, in accordance with one embodiment of the present invention.

FIG. 2 illustrates an application server 104, in accordance with one embodiment of the present invention. In this embodiment, the application server 104 provides an asynchronous error notification to the application server controller 102 in the network 100. The application server 104 provides the asynchronous error notification as an UPnP event to the application server controller 102. The present embodiment will be explained with help of FIG. 1. However, it will be apparent to a person ordinarily skilled in the art that the present invention can be explained/practiced with any other suitable embodiment of the present invention. This embodiment is explained with help of an error that occurs during installation of the application 106 in the application server 104. However, it will be apparent to a person ordinarily skilled in the art that the application server 104 described in the present embodiment can also provide notification for any other error that occurs during the execution of the application 106 or an error that occurs during the runtime of the OSGi framework 114.

The application server 104 includes a receiver 202, a processor 204 and a transmitter 206. The receiver 202 is configured to receive a command from the application server controller 102 to install an application 106 in the OSGi framework 114 available at the application server 104. The OSGi framework 108 provides an execution environment to the application 106. The processor 204 is configured to generate an error message when an error occurs during the OSGi framework 114 runtime or execution of the application 106. The processor 204 is also configured to convert the error message as a Universal Plug and Play (UPnP) event. The processor 204 provides the UPnP event to the transmitter 206. The transmitter 206 is configured to provide the UPnP event comprising the error information to the application server controller 102. In an embodiment, the transmitter uses URL of the application server controller 102 to send the UPnP event (the asynchronous error notification) to the application server controller 102. In this embodiment, the receiver 202 is also configured to receive the URL of the application server controller 102 along with the install command. The process of providing an asynchronous error notification from the application server 104 to the application server controller 102 will be explained with the help of FIG. 3.

Figure 3:
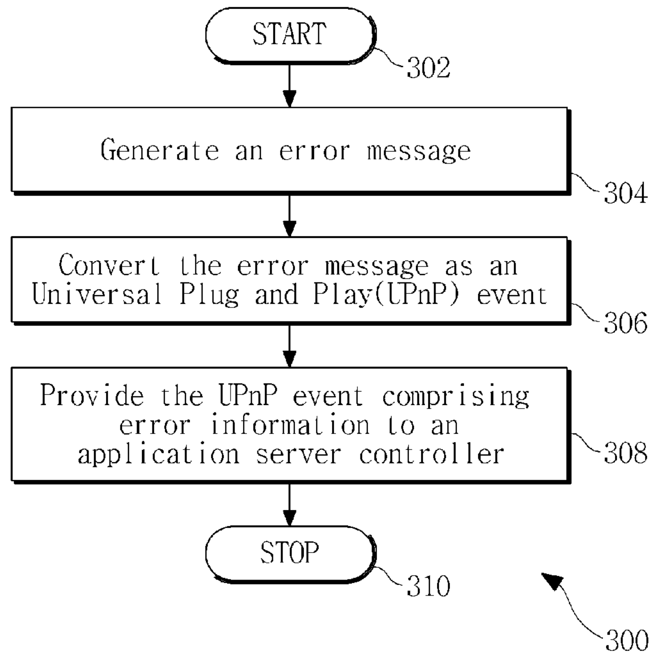
FIG. 3 illustrates a flow chart depicting a method for providing an asynchronous error notification from an application server to an application server controller, in accordance with one embodiment of the present invention.

FIG. 3 illustrates a flowchart depicting a method 300 asynchronous error notification from the application server 104 to the application server controller 102. To explain the method 300, references will be made to FIG. 1 and FIG. 2. However, it will be apparent to a person ordinarily skilled in the art that the present embodiment can be explained with the help of any other suitable embodiment of the present invention. Further, the method 300 can also include more number of steps as depicted in FIG. 3. At step 302, the method 300 is initiated. At step 304, an error message is generated. The error message is generated when an error occurs at/during Open Service Gateway initiative (OSGi) framework runtime or during installation of the application 106 in the application server 104. The error message can be associated with an exception. For example, the error message can be generated as a result an exception in the OSGi framework. Examples of the exception include, but are not limited to, BundleException, InvalidSyntaxException, DeploymentException, Input/Output (IO) exception, security exception, MalformedURLException, RuntimeException, IllegalStateException, and IllegalArgumentException. These exceptions are explained with help of the following paragraph.

A BundleException indicates an error that occurs in a Bundle Implementation. For example, BundleException can be generated by the OSGi framework 114 to denote an exception condition in a lifecycle of the bundle. An InvalidSyntaxException indicates an error in the syntax of the commands given to the OSGi Framework. A DeploymentException indicates occurrence of a deployment failure of a deployment package. A DeploymentException includes an error code and may contain the textual description of the error condition. An IOException indicates an exceptional condition occurring in the OSGi framework 114 while processing the input or output in OSGi framework 114. A SecurityException indicating one or more callers does not have an appropriate permission. A MalformedURLException indicates that a URL parameter passed to the OSGi framework is invalid. A RuntimeException indicates exceptions from the Java Virtual Machine (JVM) runtime. It can occur when there is any error generated by the bundles.

At step 306, the error message is converted as a Universal Plug and Play (UPnP) event. The error message is converted to the UPnP event as the application server controller 102 (and other controllers) may be a UPnP device. The conversion of the error message as the UPnP event enables the application server controller to interpret the error message. At step 308, the UPnP event comprising error information is provided to the application server controller 102. The error information/UPnP event can be provided to the application server controller 102 by using a Universal Resource Locator (URL) of the application server controller 102 present in the application 106. The UPnP event can be provided to the application server controller 102 with help of a UPnP eventing protocol stack. A UPnP eventing protocol stack is explained with the help of FIG. 4.

Figure 4:
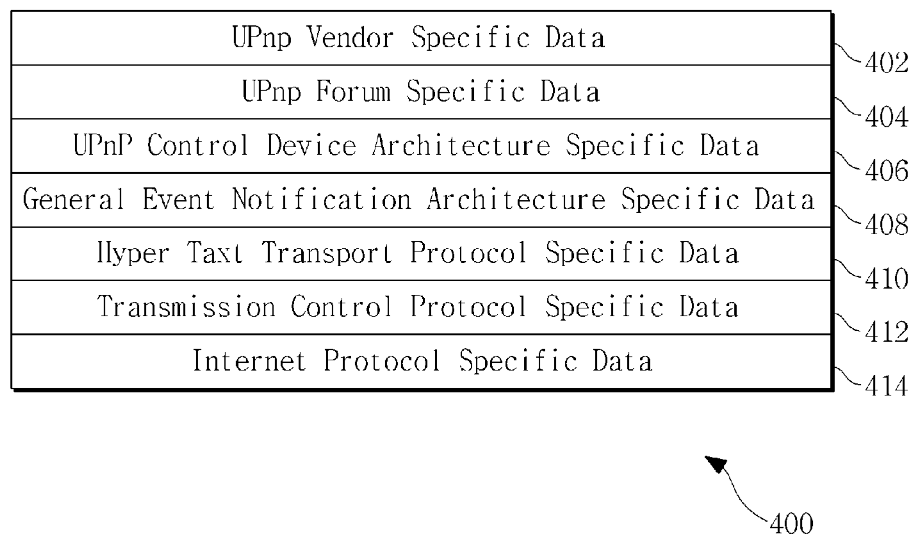
FIG. 4 is a UPnP protocol stack for providing an error notification, in accordance with one embodiment of the present invention.

FIG. 4 illustrates a UPnP protocol stack 400 for description of a device, in accordance with an embodiment of the present invention. The UPnP protocol stack includes UPnP vendor specific data 402, UPnP forum specific data 404, UPnP control device architecture specific data 406, General Event Notification Architecture (GENA) specific data 408, Hyper Text Transport Protocol (HTTP) specific data 410, Transmission Control Protocol (TCP) specific data 412 and Internet Protocol (IP) specific data 414. The protocol stack 400 defines protocols for communication in a network containing control points and control devices. For the purpose of this invention, the protocol stack 400 can be used for communication in a network containing UPnP devices having OSGi Framework and UPnP control points. The UPnP vendor 402 includes vendor specific information about an OSGi device. If we move down in the stack under UPnP vendor 402 is UPnP forum 404. The UPnP forum 404 includes information defined by the UPnP Forum committee to standardize the process for communication. After UPnP forum 404 comes UPnP control device architecture 406. The UPnP control device architecture 406 contains the description as described in the basic device and service description templates. After UPnP device architecture comes GENA 408. GENA 408 defines an HTTP notification architecture that helps to transmit notifications between resources running on HTTP. The message from the OSGi device communicating by using the protocol stack 400 will use HTTP 410 running on TCP 412 to multicast or unicast the messages. Finally all the messages will be delivered over IP 414.

Various embodiments of the present invention as described above provide the following advantages. The present invention provides a technique which enables an application server to provide information related to an error (that occurs at the application server side) to an application server controller. The present invention also enables the application server to convert the error notification as an UPnP event before the error notification is provided to the application server controller. The error notification of the present invention enables the application server controller to take necessary actions when an error occurs at the application server side. For example, the application controller will stop sending unnecessary messages to the application server when an error has occurred at the application server. Further, application server controller can re-search for an alternative application server when an error occurs at the application server side.

While the embodiments of the present invention have been illustrated and described, it will be clear that the present invention and its advantages are not limited to these embodiments only. Numerous modifications, changes, variations, substitutions and equivalents will be apparent to those skilled in the art without departing from the spirit and scope of the present invention as described in the claims.

The invention claimed is:

1. A method for providing an asynchronous error notification from an application server to an application server controller in a network, the method comprising:

generating an error message when an error occurs during Open Service Gateway initiative runtime of an application;

converting the error message to a Universal Plug and Play (UPnP) event; and providing the UPnP event including error information to the application server controller, wherein providing the UPnP event comprises sending the error information to the application server controller by using a Universal Resource Locator (URL) of the application server controller.

2. The method of claim 1, wherein the error is associated with an exception in the application.

3. The method of claim 2, wherein the exception includes a BundleException, the BundleException indicating an error occurring in a Bundle Implementation.

4. The method of claim 2, wherein the exception includes an InvalidSyntaxException indicating an error in syntax of commands given to the application.

5. The method of claim 2, wherein the exception includes a DeploymentException, the DeploymentException indicating occurrence of a deployment failure of a deployment package.

6. The method of claim 2, wherein the exception includes an Input/Output (IO) exception, the IO exception indicating an exception condition occurring in the application while processing input or output in the application.

7. The method of claim 2, wherein the exception includes a security exception, the security exception indicating that at least one caller does not have an appropriate permission, and wherein the at least one caller indicates an application server controller identified with a unique identifier.

8. The method of claim 2, wherein the exception includes a MalformedURLException, the MalformedURLException indicating a Universal Resource Locator (URL) parameter passed to the application is invalid.

9. The method of claim 2, wherein the exception includes a RuntimeException, the RuntimeException indicating at least one exception from a Java Virtual Machine (JVM) runtime when an error is generated by at least one bundle.

10. The method of claim 2, wherein the exception includes an IllegalArgumentException, the IllegalArgumentException indicating an error occurring at the application if a numerical component is negative or a qualifier string passed as an input parameter is invalid.

11. An application server comprising:

a processor configured to generate an error message when an error occurs during Open Service Gateway initiative (OSGi) application runtime and convert the error message to a Universal Plug and Play (UPnP) event; and a transmitter configured to provide the UPnP event including error information to an application server controller, wherein the transmitter is configured to send the error information to the application server controller by using a Universal Resource Locator (URL) of the application server controller.

12. The application server of claim 11, further comprising a receiver configured to receive the URL of the application server controller.

13. The application server of claim 11, further comprising a receiver configured to receive a command from the application server controller to install an application in an OSGi framework available at the application server.

* * * * *